Feb. 17, 1959   J. T. DEWAN   2,874,301
WELL LOGGING APPARATUS
Filed Aug. 10, 1953
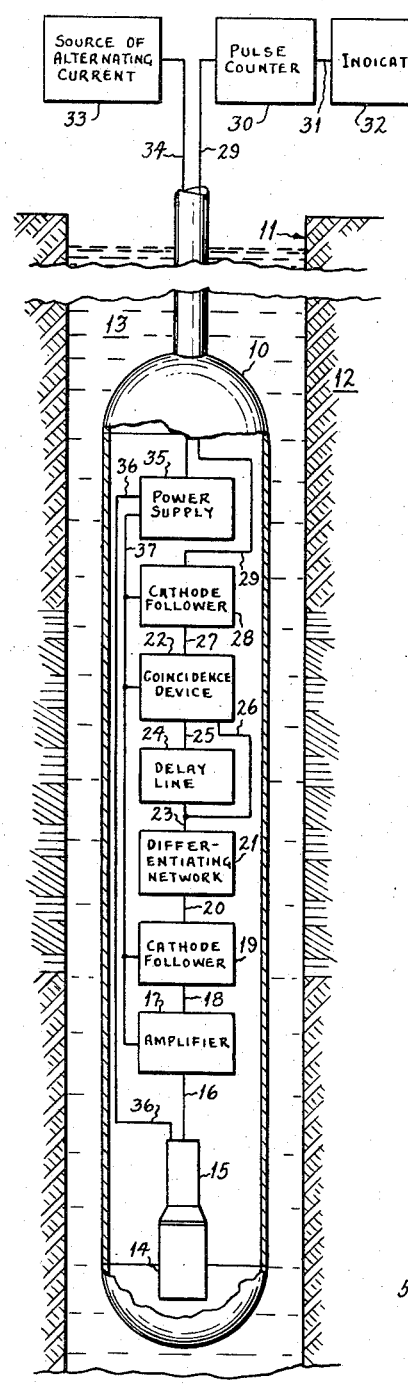
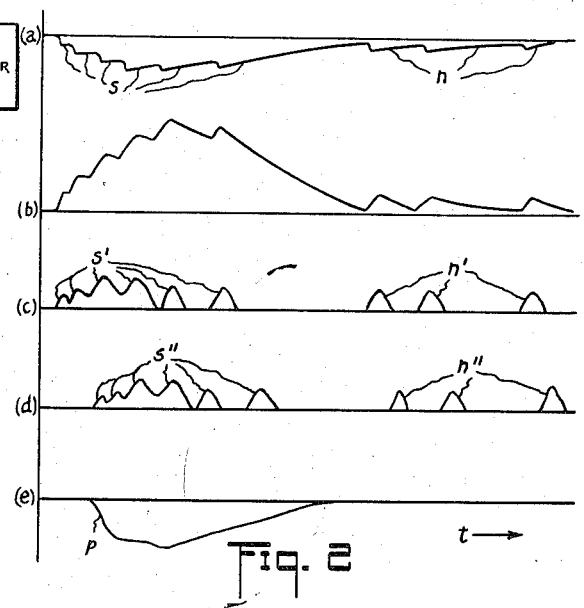
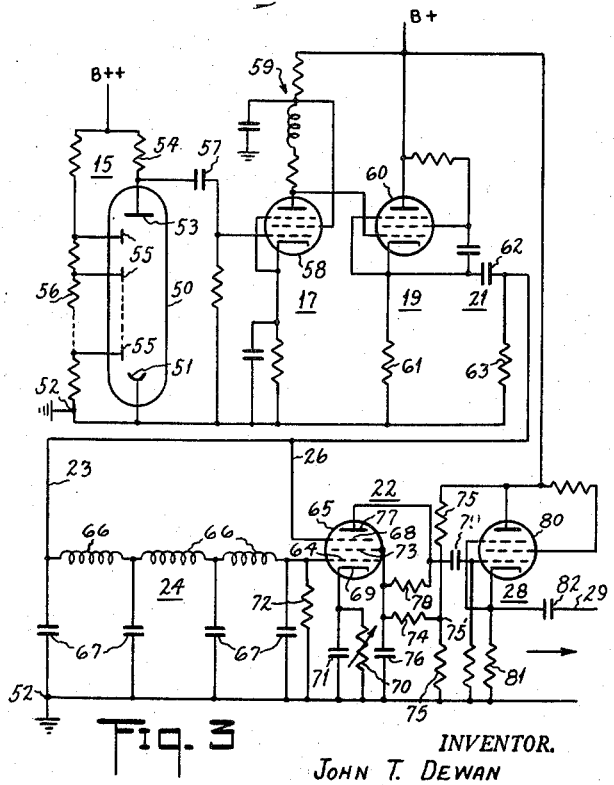
INVENTOR.
JOHN T. DEWAN
BY
Campbell, Brumbaugh, Free and Graves
ATTORNEYS

United States Patent Office 2,874,301
Patented Feb. 17, 1959

2,874,301
WELL LOGGING APPARATUS

John T. Dewan, Houston, Tex., assignor, by mesne assignments, to Schlumberger Well Surveying Corporation, Houston, Tex., a corporation of Texas Application August 10, 1953, Serial No. 373,240

4 Claims. (Cl. 250—71)

The present invention relates to radioactivity well logging apparatus and, more particularly, to novel and improved radiation detecting apparatus of the scintillation type adapted to be employed for obtaining indications of radiation emitted by, induced in, or scattered by the formations traversed by a bore hole and/or by the fluid contained in said bore hole.

As used hereinafter, the phrase "particle of energy" is intended to denote both particle as well as wave energy. For example, a quantum or photon of gamma radiation, a neutron, or a particle carrying an electrical charge are all considered to be within the scope of the definition "particle of energy."

It has been proposed to employ a radiation detecting system of the scintillation type for logging radiation emanating either naturally, or under induced conditions, from the formations traversed by a bore hole. Such a system comprises a scintillation element for translating incident energy particles, such as gamma rays, into light energy and photoelectric means for deriving electrical energy from the light energy. Usually, the photoelectric means is an electron multiplier phototube.

While the foregoing system is generally satisfactory under ordinary conditions, and is attractive for use in radioactivity well logging by reason of its high sensitivity to incident radiation, it is also sensitive to ambient temperature. That is, the photomultiplier inherently produces output pulses in the absence of incident light. These pulses, usually referred to as "dark current," occur randomly, but their average rate increases with temperature. Consequently, for a given incident flux of light pulsations, corresponding to a particular value of incident radiant or particle energy, the average number of output pulses per unit time from the photomultiplier varies with temperature. Since the temperature in a bore hole increases with depth, it is evident that accurate, quantitative radioactivity measurements may not be obtainable with conventional scintillation equipment in such an environment.

It is, therefore, an object of the invention to provide new and improved radiation detecting apparatus of the scintillation type which is not subject to the aforementioned deficiency of the prior art devices.

Logging apparatus, in accordance with the present invention comprises a scintillation element, adapted to traverse a well or bore hole, for deriving from each particle of incident energy of one character energy of a different character exhibiting at least two discrete time-displaced "bursts" or pulsations. A photoelectric device which traverses the bore hole with the scintillation element provides electrical pulses corresponding to the "bursts" of energy. The apparatus further includes means for producing output pulses, each representing at least a pair of electrical pulses, and means for utilizing the output pulses to obtain a log of the bore hole under investigation.

The invention may be more fully understood by reference to the following detailed description taken in conjunction with the accompanying figures of the drawing, in which:

Fig. 1 is a schematic representation of radioactivity well logging apparatus of the scintillation type disposed within a bore hole and constructed in accordance with the present invention;

Fig. 2 represents various waveforms characterizing the operation of the apparatus shown in Fig. 1 and useful in explaining its operation; and Fig. 3 is a detailed circuit diagram of a portion of the apparatus illustrated in Fig. 1, in accordance with the invention.

In Fig. 1 of the drawing, there is shown a pressure-tight housing 10 adapted to traverse a bore hole 11 that is drilled through the earth formations 12. The bore hole 11 may not contain an electrically conductive drilling fluid 13, such as a water base mud.

A scintillation element 14 may be enclosed within the housing 10, as shown in Fig. 1, or mounted in the wall of the housing 10 or in some fixed position relative to the housing and adjacent thereto.

The element 14 may take the form of any conventional scintillation element. For example, it may be composed of sodium iodide in solid crystalline form. A phototube 15, preferably of the electron multiplier type, may be disposed within the housing 10, having its photocathode (Fig. 3) positioned in light transmitting relation with the scintillation element 14.

The output of the photomultiplier 15 may be connected by a conductor 16 to an amplifier 17. The amplifier 17 may be connected by a conductor 18 to a cathode follower circuit 19, which may be connected through a conductor 20 to a differentiating network 21. The output of the differentiating network 21 may in turn be coupled to a coincidence device 22 by means of a conductor 23, a delay line 24, and a conductor 25. The differentiating network 21 may also be directly coupled by a conductor 26 to the coincidence device 22. The output of the coincidence device 22 may be connected through a conductor 27 to a cathode follower circuit 28.

The output of the cathode follower circuit 28 may be connected through a conductor 29 to a conventional pulse counter circuit 30 which may be located in the housing 10 or at the surface of the earth, as shown in Fig. 1. If the pulse counter circuit 30 is located at the surface of the earth, the conductor 29 may be part of a conventional insulated conducting cable adapted to support the housing 10 within the bore hole 11. Conventional winch equipment (not shown) may be located at the surface to control the movement of the housing 10.

The pulse counter circuit 30, in turn, may be connected through a conductor 31 to a suitable indicating means 32, for example, a recording voltmeter. The indicator 32 may be synchronized in any conventional manner with the winch (not shown) used to raise or lower the housing 10 through the bore hole 11, so that the indications recorded by the indicator 32 may be related to the position of the housing 10 within the bore hole 11.

In order to energize the various electronic stages within the housing 10, a suitable source of alternating current energy 33 may be connected through an electrically insulated cable conductor 34 to a power supply 35 disposed within the housing 10. The power supply 35 may be arranged to supply the necessary high voltage to the photomultiplier 15 through a conductor 36, as well as the conventional lower plate voltage to the amplifier 17, the cathode follower 19, the coincidence device 22 and the cathode follower 28, through a conductor 37.

The delay line 24 may be of known construction interposing a predetermined time delay on portions of the output signal from the differentiating network 21.

The operation of this circuit just described may be best understood by reference to Fig. 2 which represents the various waveforms in the electronic system of Fig. 1, plotted on a common time scale.

In response to each particle of radiation energy emanating from the earth formations 12, a series of light pulses are generated within the scintillation element 14. For example, when the scintillation element 14 is excited by the passage of a gamma ray through it, it releases its excitation energy in a number of discrete light pulses spaced in rapid succession over an interval of about 0.5 microsecond. Of course, this time interval occurs in crystals of sodium iodide; other crystal materials may result in different values. These light pulses are then converted to corresponding electrical pulses by the photomultiplier 15. Its output, represented in Fig. 2a, comprises a series of electrical pulsations designated "s." In addition to these desired pulses, the output of the photomultiplier 15 may also include randomly distributed noise pulses, represented as "n" in Fig. 2a.

The composite output of the photomultiplier 15 is then amplified by the amplifier 17, producing an amplified waveform as shown in Fig. 2b. After amplification by the amplifier 17, the composite pulse train passes through the cathode follower 19 to the differentiating network 21 which acts to thereby sharpen or differentiate the pulses, deriving a pulse train as shown in Fig. 2c, exhibiting signal pulses s' and noise pulses n'. The pulse train of Fig. 2c is then applied directly to one input circuit of the coincidence device 22 and indirectly to the other input circuit of the coincidence device 22 after experiencing a time delay of 0.15 microsecond in the delay line 24. The delayed pulse train, exhibiting the signal pulses s'' and the noise pulses n'', is represented in Fig. 2d.

Since the coincidence device 22 is arranged to produce an output pulse only in response to the simultaneous occurrence of pulses at both of its input circuits, it is obvious that any single pulse from the differentiating network 21 will not produce an output pulse in the coincidence device 22. Accordingly, in response to the time-overlapping portions of the signal pulse trains s' and s'' of Figs. 2c and 2d, an output pulse, designated as "p" in Fig. 2e, is supplied to the cathode follower 28 and is then transmitted via the conductor 29 to the pulse counter circuit 30. However, since none of the noise pulses n' and n'' (Figs. 2c and 2d) are concurrent in time, no pulses representing the noise or "dark current" are supplied to the pulse counter circuit 30.

In other words, the randomly occurring noise pulses from the photomultiplier 15 generally do not have the time-spacing prescribed by the delay of the delay line 24. Therefore, substantially no corresponding output pulse is presented to the pulse counter circuit 30. On the other hand, the pulsations within each interval of the output of the scintillation element 14 representing a particle of energy do effect at least one coincidence and an output pulse is produced by the coincidence device 22 and supplied to the pulse counter circuit 30.

Thus, in response to each particle of radiation energy incident on the scintillation element 14 resulting in time-spaced "bursts" of light energy, a single electrical pulse is supplied to the pulse counter circuit 30. As the housing 10 is raised or lowered through the bore hole 11, the output potential of the pulse counter circuit 30, representing the number of counts per unit time or any other useful data pertaining to the radiation, is recorded by the indicator means 32 as a continuous function of depth.

It is thus evident that noise pulses from photomultiplier 15 are effectively eliminated in the radiation detecting system prior to pulse counting. The derived summation or pulse count, therefore, is not altered appreciably by reason of the changes in "dark current" of the photomultiplier due to variations in the ambient temperature. Accordingly, scintillation type radiation detecting apparatus embodying the present invention can provide accurate quantitative data and is well suited for use in logging the earth formations traversed by a bore hole.

In Fig. 3, there is shown an exemplary detailed circuit diagram of the elements 15, 17, 19, 21, 24, 22 and 28 of Fig. 1. The photomultiplier 15 may comprise a conventional photomultiplier tube 50 provided with a photocathode 51, connected to a ground 52, and a collector electrode 53, connected by a load resistor 54 to a source of unidirectional, high voltage B++. A series of dynodes or secondary-electron-emitting electrodes 55 are interposed between the photocathode 51 and the collector plate 53 and are connected to successive taps of a voltage divider 56 connected between the source of high voltage and the ground 52. The high voltage source should be arranged to provide a positive potential of between 800 and 1200 volts across the voltage divider 56.

The output signal of the photomultiplier tube 50 may be supplied through a coupling condenser 57 to the control grid of a pentode-type electron discharge device 58 connected as the pulse amplifier 17 and having an anode load circuit 59, designed to provide high frequency compensation, connected to a plate voltage source B+, which may be on the order of 250 volts. The output of the pulse amplifier 17 may be applied directly from the anode of the discharge device 58 to the control grid of another pentode-type electron discharge device 60 connected in the cathode follower circuit 19. The output of the cathode follower circuit 19 taken across the cathode resistor 61 may be applied directly to the differentiating network 21, which may comprise a series condenser 62 having a small capacitance value and a shunt resistor 63 having a relatively low resistance value. The time-constant of the differentiating network 21 may preferably be 0.15 microsecond, when the scintillation element 14 is composed of a sodium iodide crystal, but may be varied to accommodate other materials.

The output of the differentiating network 21 may be indirectly coupled to a control grid 64 of a pentode-type electron discharge device 65 connected as the coincidence device 22, through the conductor 23 and the delay line 24. The delay line 24 may comprise a plurality of series inductors 66 and shunt condensers 67 designed in a known manner to provide the required delay of 0.15 microsecond. The electron discharge device 65 may be preferably of the gated beam variety, for example, of the type designated 6BN6. The output of the differentiating network 21 may also be directly coupled through the conductor 26 to a second control grid 68 of the discharge device 65. The cathode 69 of the device may be connected to the ground 52 by a variable bias resistor 70 shunted by a cathode by-pass condenser 71. The control grid 64 may also be grounded by a resistor 72 which further serves to provide a termination for the delay line 24.

The screen grid 73 of the discharge device 65 may be connected by a resistor 74 to the tap 75' of a voltage divider 75 connected between a source of potential and the ground 52. The screen grid 73 may be by-passed to the grounded 52 by a condenser 76 and may also be connected to the anode 77 of the device 65 by a load resistor 78. The output of the tube 65 may be connected from the anode 77 through a coupling condenser 79 to a control grid of a pentode-type electron discharge device 80 operating as the cathode follower 28. The output of the cathode follower 28 may be taken across the cathode resistor 81 and supplied through the coupling condenser 82 and the lead 29 to the pulse counter circuit 30 (Fig. 1).

The over-all operation of the circuit of Fig. 3 follows that presented hereinbefore in connection with the apparatus of Fig. 1. More particularly, the photomultiplier tube 50 operates in a well-known manner to produce an electrical signal across the load resistor 54 representing the light energy incident on the photocathode 51. This signal has a waveform similar to that shown in Fig. 2a. This waveform, which is composed of the signal pulses *s* and the noise pulses *n*, is amplified and inverted in the pulse amplifier 17 to produce a positive amplified waveform as shown in Fig. 2b. The amplified waveform is then fed through the cathode follower 19 and the differentiating network 21, appearing as a positive signal across the cathode resistor 61 which is differentiated by the differentiating network 21 thereby producing differentiated or sharpened signal pulses *s'* and noise pulses *n'*, as shown in Fig. 2c.

The pulse train of Fig. 2c is then fed through the conductor 26 to the control grid 68 of the coincidence device 22. The same pulse train is also fed through the delay line 24 to the control grid 64 of the coincidence device 22 to produce a delayed pulse train as represented by Fig. 2d. The electron discharge device 65 of the coincidence device 22 is adapted to become conductive only upon the simultaneous occurrence of positive pulses on the control grids 64 and 68, viz. when there is a coincidence of the positive pulses of the pulse trains represented by Figs. 2c and 2d. When the discharge device 65 becomes conductive, output pulses are fed through the condenser 79 to the control grid of the cathode follower 28. This produces a negative pulse across the cathode resistor 81 which is supplied through the coupling condenser 82 and the conductor 29 to the pulse counter circuit 30.

Therefore, a novel and improved apparatus is provided for obtaining indications of the radiations emitted by, induced in, or scattered by the formations traversed by a bore hole and/or by the fluid contained in said bore hole. Further, it is obvious, that a considerable improvement in the ratio of desired signal to noise is obtained over the conventional arrangements of the prior art.

It will be understood that the above described representative embodiment is meant to be merely exemplary and is susceptible of modification and variation without departing from the spirit and scope of the invention. For example, although a system for measuring naturally occurring particles of radiant energy has been illustrated, a suitable source of neutrons, gamma rays, X-rays, or ultra-violet light may be positioned to travel with the housing 10 into the bore hole 11. Accordingly, other informative logs may be obtained in a well-known manner. The formations, for example, may be irradiated by a source of neutrons and the scintillation element may be designed to respond either to gamma rays resulting from neutron capture or to neutrons slowed by the formations to low energy levels. Of course, if neutrons are to be detected, a suitable scintillation element arrangement of known construction may be employed. Therefore, the invention is deemed to be limited only by the scope of the appended claims.

I claim:

1. Radioactivity well logging apparatus, comprising a scintillation element adapted to be exposed to particles of radiant energy present in a bore hole, photoelectric means for converting light emitted from said scintillation element in response to said particles of energy into an electrical signal, means for differentiating said electrical signal to produce a plurality of independent electrical pulse trains, means for delaying at least one of said independent pulse trains, and coincidence means responsive to said plurality of independent pulse trains for producing output pulses representative of the radiations within the bore hole.

2. Radioactivity well logging apparatus, comprising a scintillation element adapted to be lowered through a bore hole and to be exposed to particles of radiant energy present within the bore hole, photoelectric means mounted in fixed relation to said scintillation element for converting light emitted from said scintillation element in response to said particles of energy into an electrical signal, means for differentiating said electrical signal to produce a plurality of independent pulse trains, means for delaying at least one of said independent pulse trains, coincidence means responsive to said plurality of independent pulse trains for producing output pulses, and indicating means responsive to said output pulses for providing indications of the radiations present within the bore hole.

3. Radioactivity well logging apparatus, comprising a scintillation element adapted to be exposed to particles of radiant energy present in a bore hole, means for converting light emitted from said scintillation element in response to said particles of energy into electrical pulses, delay means connected to receive signals that are a function of said electrical pulses, means jointly responsive to said signals that are a function of said electrical pulses and to the output of said delay means for providing output pulses only when the two are in substantial coincidence, and means for providing indications of said output pulses.

4. Radioactivity well logging apparatus, comprising a scintillation element adapted to be exposed to particles of radiant energy present in a bore hole, means for converting light emitted from said scintillation element in response to said particles of energy into electrical pulses, means for electrically differentiating said electrical pulses, means for delaying said differentiated electrical pulses, means jointly responsive to said differentiated pulses and to said delayed differentiated pulses for providing output pulses only when the two are in substantial coincidence, and means for providing indications of said output pulses.

References Cited in the file of this patent

UNITED STATES PATENTS

| | | |
|---|---|---|
| 2,636,993 | Jakobson | Apr. 28, 1953 |
| 2,648,012 | Scherbatskoy | Aug. 4, 1953 |
| 2,659,011 | Youmans et al. | Nov. 10, 1953 |
| 2,659,823 | Vossberg | Nov. 17, 1953 |